May 7, 1929.  A. J. JACOBS  1,711,566
SCOOP
Filed March 5, 1927

INVENTOR.
Aaron J. Jacobs
BY Mayer, Warfield & Watson
ATTORNEYS.

Patented May 7, 1929.

1,711,566

UNITED STATES PATENT OFFICE.

AARON J. JACOBS, OF BROOKLYN, NEW YORK, ASSIGNOR TO THE JACOBS BROTHERS CO., INC., OF BROOKLYN, NEW YORK, A CORPORATION OF NEW YORK.

SCOOP.

Application filed March 5, 1927. Serial No. 173,001.

This invention relates to an improved dispensing scoop.

It is an object of the invention to provide a scoop for use in the dispensing of substances such as flour, sugar, coffee, etc., and to be employed, for example, by grocers, and in which the scoop will not spill its contents when the person utilizing the same releases the handle while the scoop is resting upon the counter.

A further object of the invention is that of achieving the foregoing result in a scoop of neat appearance and by means of which substances may be efficiently handled in a sanitary manner and the construction of which scoop will be simple and readily achievable so that the finished article may be produced at a comparatively nominal figure.

Other objects of the invention will in part be obvious and will in part appear hereinafter.

With these and further objects in mind, the invention accordingly comprises an article of manufacture possessing the features, properties and the relation of elements which will be exemplified in the article hereinafter described, and the scope of the application of which will be indicated in the claim.

Figure 1:
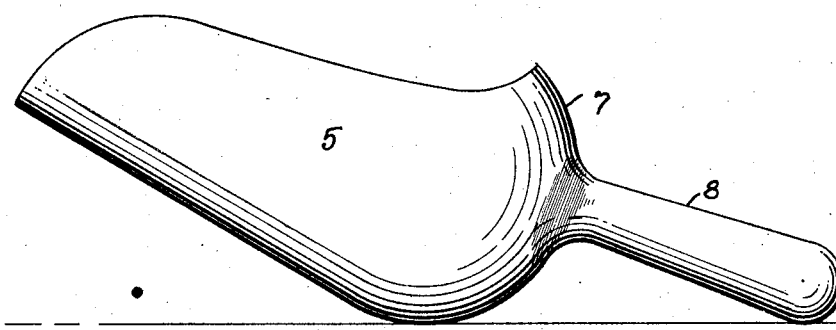
Figure 2:
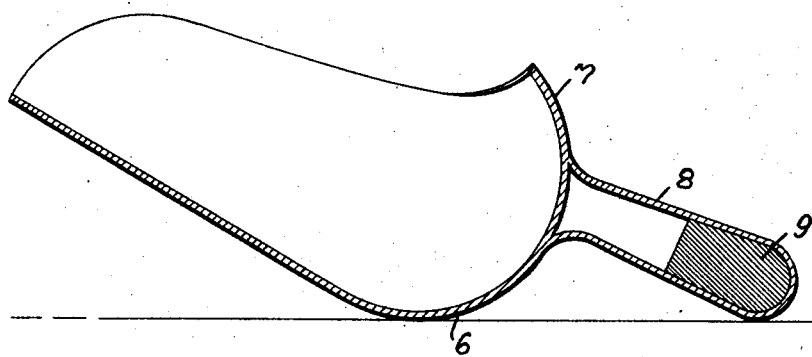

For a fuller understanding of the nature and objects of the invention reference should be had to the following detailed description taken in connection with the accompanying drawings, in which:

Figure 1 is a side elevation showing a scoop embodying the present invention; and Fig. 2 is a sectional view thereof.

In these views the numeral 5 indicates the scoop body, which may be provided with an open mouth and tapered side-wall portions, and the base of which is convex as at 6, the side walls and base being preferably continued to provide a back-portion 7.

The scoop body, while constructed of any desired material, is formed preferably of heavy-gage aluminum; and a tube-like handle 8 preferably of the same material is attached—by welding, for example—to the rounded back 7 and extends outwardly therefrom. As shown, this handle preferably has a closed outer end, and the outer portion of the interior thereof is filled with a heavy material, for example, a leaden body 9. By this construction, the scoop not alone maintains the position shown when empty and placed upon a horizontal supporting surface, but also assumes such position when filled with the usual substances, in that the body 9 is so comparatively heavy that it overbalances the entire scoop together with the usual contents of the latter. More particularly, this will occur in that the rounded or curved base-portion 6 will act as a fulcrum, the handle functioning to swing the ladle or scoop body to the position shown.

On the other hand, the scoop is not cumbersome, for the reason that the major portion thereof is constructed preferably of such a light material as aluminum.

Thus, among others, the objects of the invention have been accomplished, and since certain changes may be made in the above article, and different embodiments of the invention could be made, without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having described my invention, what I claim as new and desire to secure by Letters Patent is:

As an article of manufacture, a scoop including a semi-cylindrical body having a semi-spherical end, said body forming a rounded base to bear against a supporting surface and to rock freely in all directions with respect thereto, and a relatively short handle extending from the end of such body, united with the latter and having a transversely curved extremity, the weight of such parts being distributed to establish the center of gravity of the scoop materially to the rear of such rounded base portion and to an extent sufficient to cause the end of such handle to automatically bear against the scoop supporting surface and the body of such scoop to be inclined upwardly even with such body filled with material of normal weight, the axis of the handle and the lowermost line of the semi-cylindrical portion of the scoop converging and intersecting forwardly of the front end of the scoop.

In testimony whereof I affix my signature.

AARON J. JACOBS.